(12) United States Patent
Henry

(10) Patent No.: US 9,169,595 B2
(45) Date of Patent: Oct. 27, 2015

(54) METHOD OF FOLDING AND WELDING FABRIC

(71) Applicant: Miller Weldmaster Corporation, Navarre, OH (US)

(72) Inventor: Brian D. Henry, North Lawrence, OH (US)

(73) Assignee: Miller Weldmaster Corporation, Navarre, OH (US)

( * ) Notice: Subject to any disclaimer, the term of this patent is extended or adjusted under 35 U.S.C. 154(b) by 146 days.

(21) Appl. No.: 14/071,143

(22) Filed: Nov. 4, 2013

(65) Prior Publication Data

US 2014/0124127 A1    May 8, 2014

Related U.S. Application Data

(60) Provisional application No. 61/722,432, filed on Nov. 5, 2012.

(51) Int. Cl.
| | |
|---|---|
| *D06H 5/00* | (2006.01) |
| *B29C 65/18* | (2006.01) |
| *B29C 65/78* | (2006.01) |
| *B29C 65/00* | (2006.01) |
| *B29C 53/36* | (2006.01) |

(52) U.S. Cl.
CPC *D06H 5/00* (2013.01); *B29C 53/36* (2013.01); *B29C 65/18* (2013.01); *B29C 65/7835* (2013.01); *B29C 65/7841* (2013.01); *B29C 66/1122* (2013.01); *B29C 66/135* (2013.01); *B29C 66/431* (2013.01); *B29C 66/729* (2013.01); *B29C 66/8242* (2013.01); *B29C 66/8322* (2013.01); *B29C 66/845* (2013.01); *B29C 2053/362* (2013.01); *Y10T 156/1051* (2015.01)

(58) Field of Classification Search
None
See application file for complete search history.

(56) References Cited

U.S. PATENT DOCUMENTS

| | | | |
|---|---|---|---|
| 1,901,477 A | 3/1933 | Southwick | |
| 2,487,392 A | 11/1949 | Southwick | |
| 5,091,038 A * | 2/1992 | Greller et al. | 156/443 |
| 7,094,298 B2 | 8/2006 | Schwetz | |
| 2008/0308234 A1 | 12/2008 | Seo | |
| 2011/0083803 A1 | 4/2011 | Henry | |
| 2014/0124125 A1 | 5/2014 | Nussbaum et al. | |

* cited by examiner

*Primary Examiner* — Barbara J Musser
(74) *Attorney, Agent, or Firm* — Sand & Sebolt

(57) ABSTRACT

A system and method for welding edge seams at the edges of fabric is presented. A method begins by lowering a fabric pre-fold bar onto a piece of fabric. A pre-aligned portion of the fabric is pushed on top of the pre-fold bar so that the pre-fold bar is between the portion of fabric on top of the fabric pre-fold bar and other fabric below the pre-fold bar. The fabric on top of the fabric pre-fold bar is folded edge fabric and fabric not on top of the fabric pre-fold bar is not folded edge fabric. A folded edge is formed between these two sections of fabric. The method pinches some of the fabric at the folded end and then pulls the folded edge fabric off of the fabric pre-fold bar. After that, the method welds at least some of the folded edge fabric to the not folded edge fabric.

8 Claims, 12 Drawing Sheets

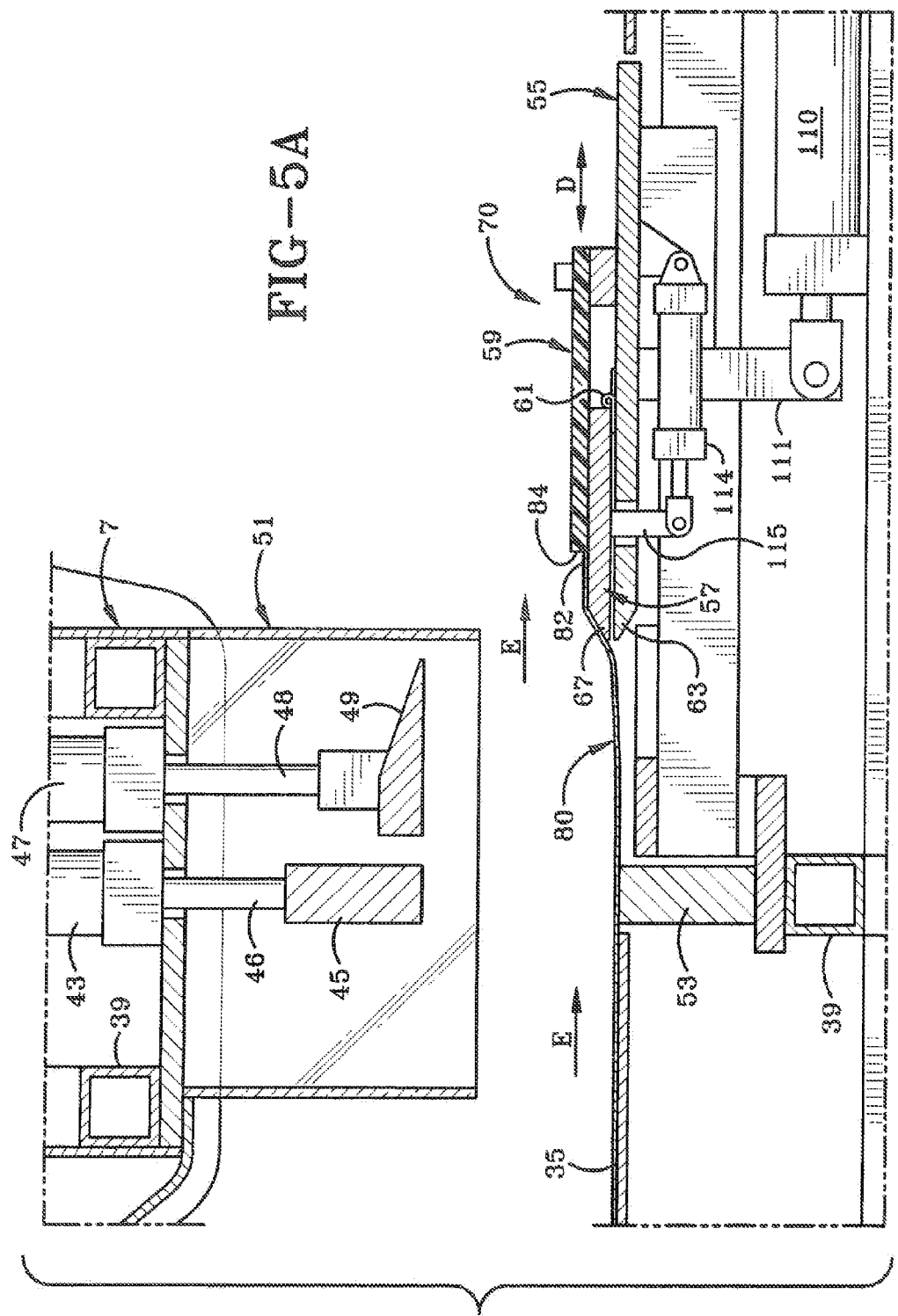

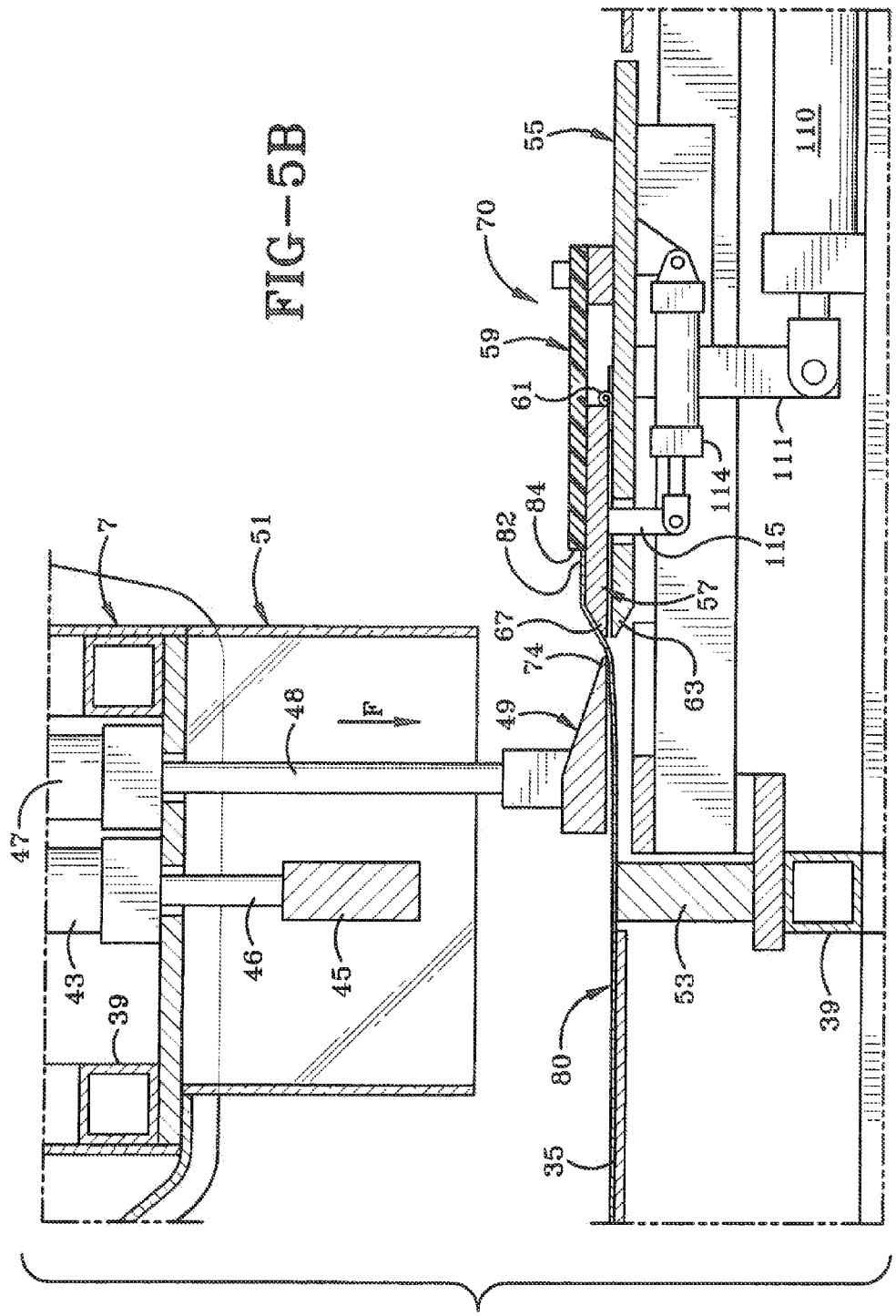

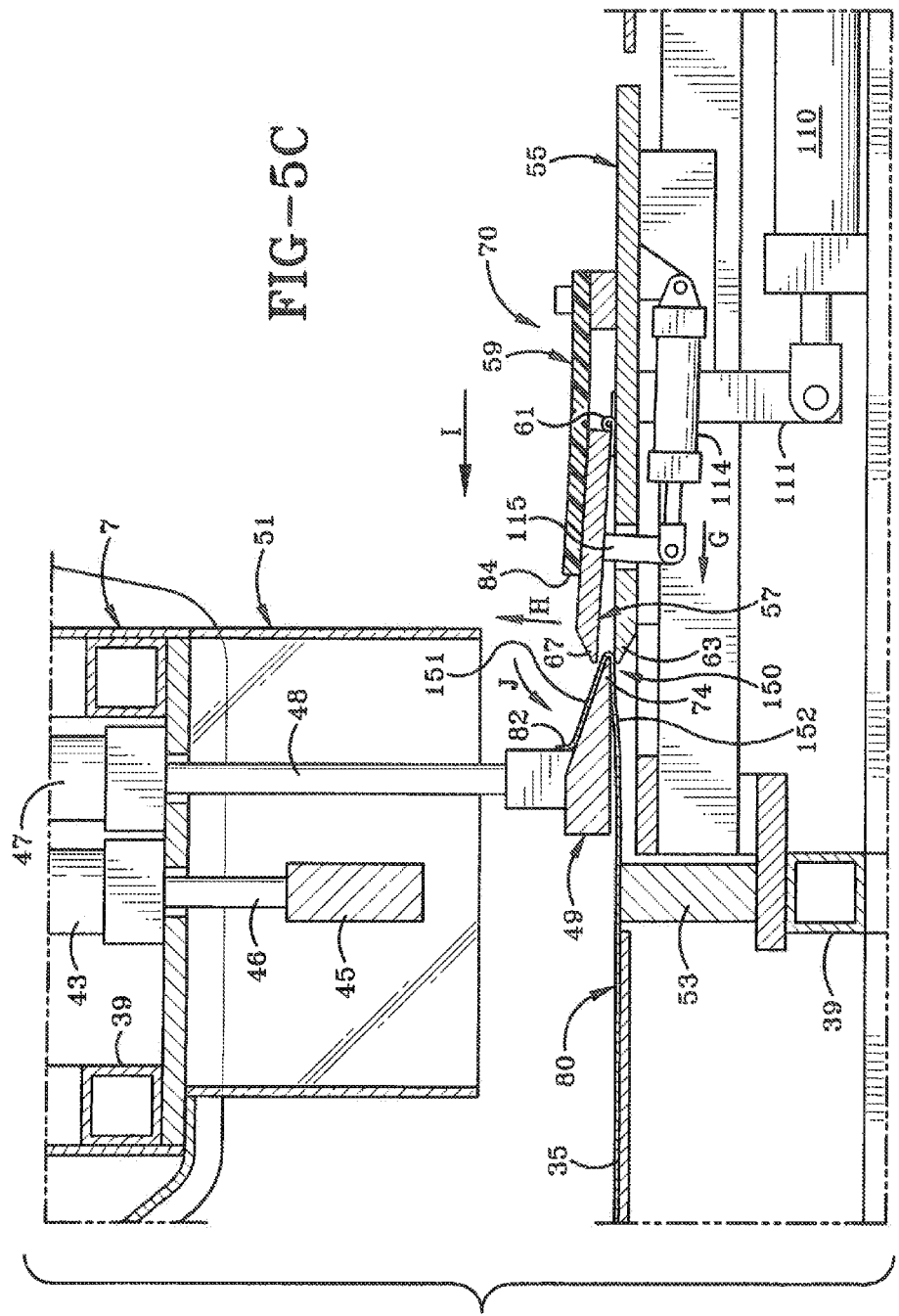

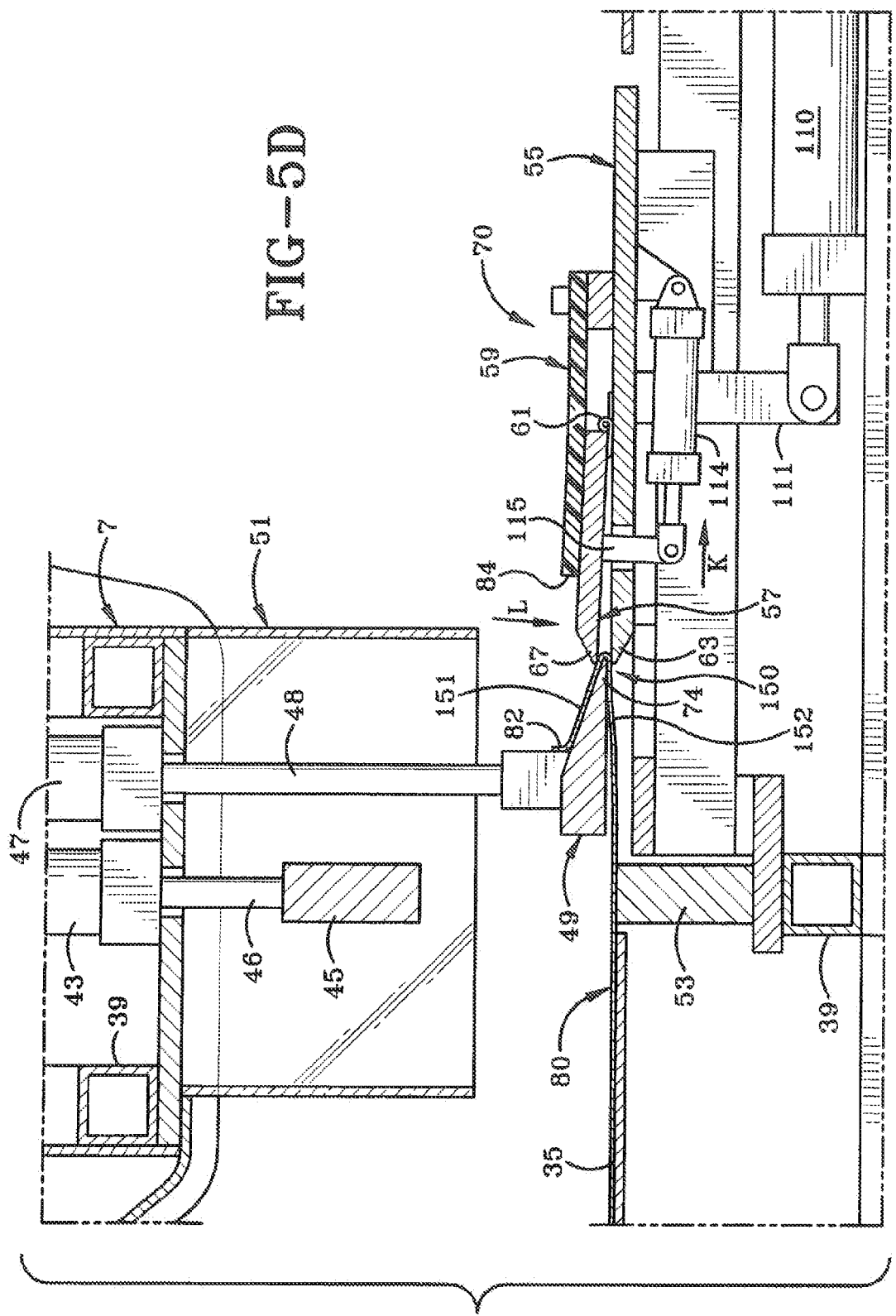

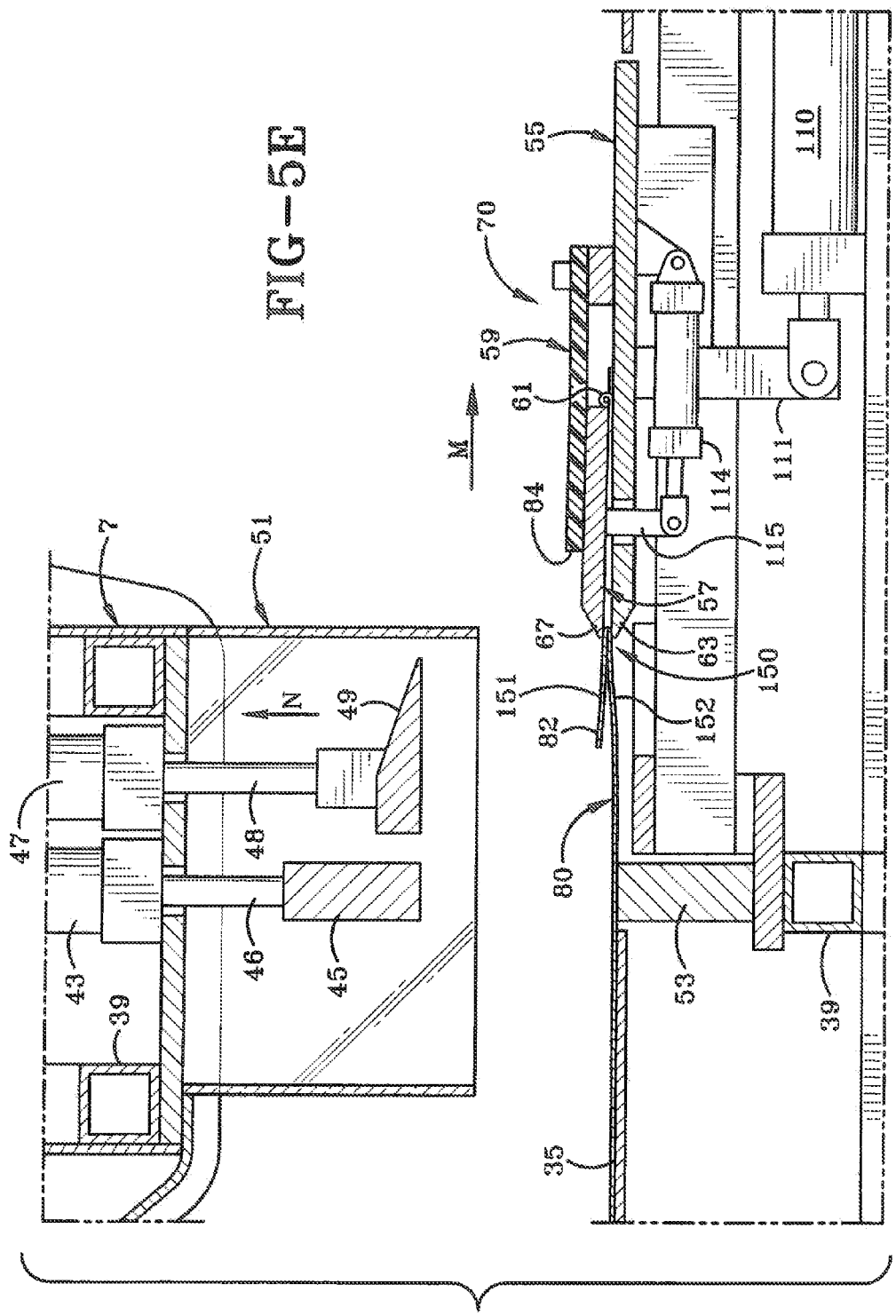

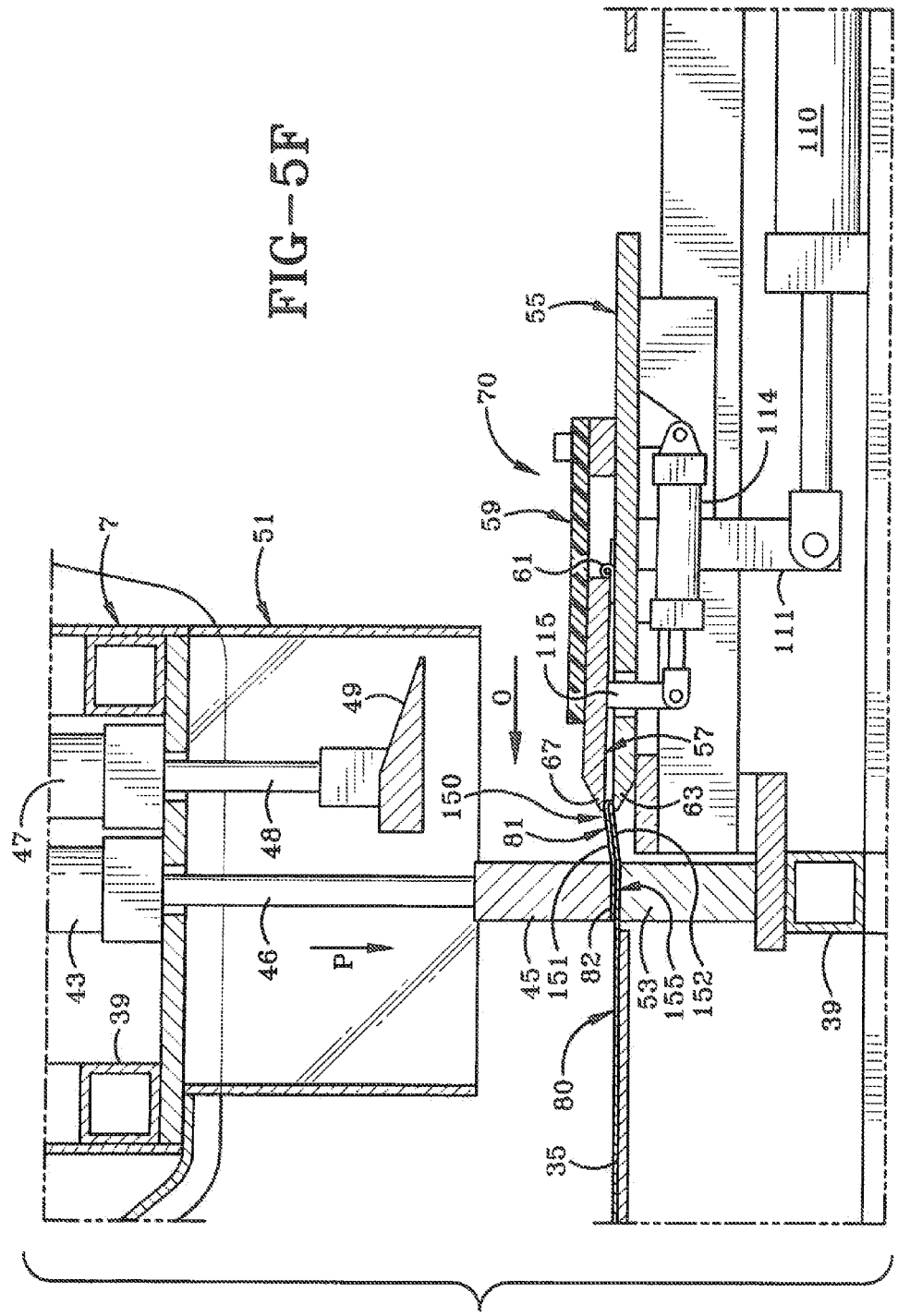

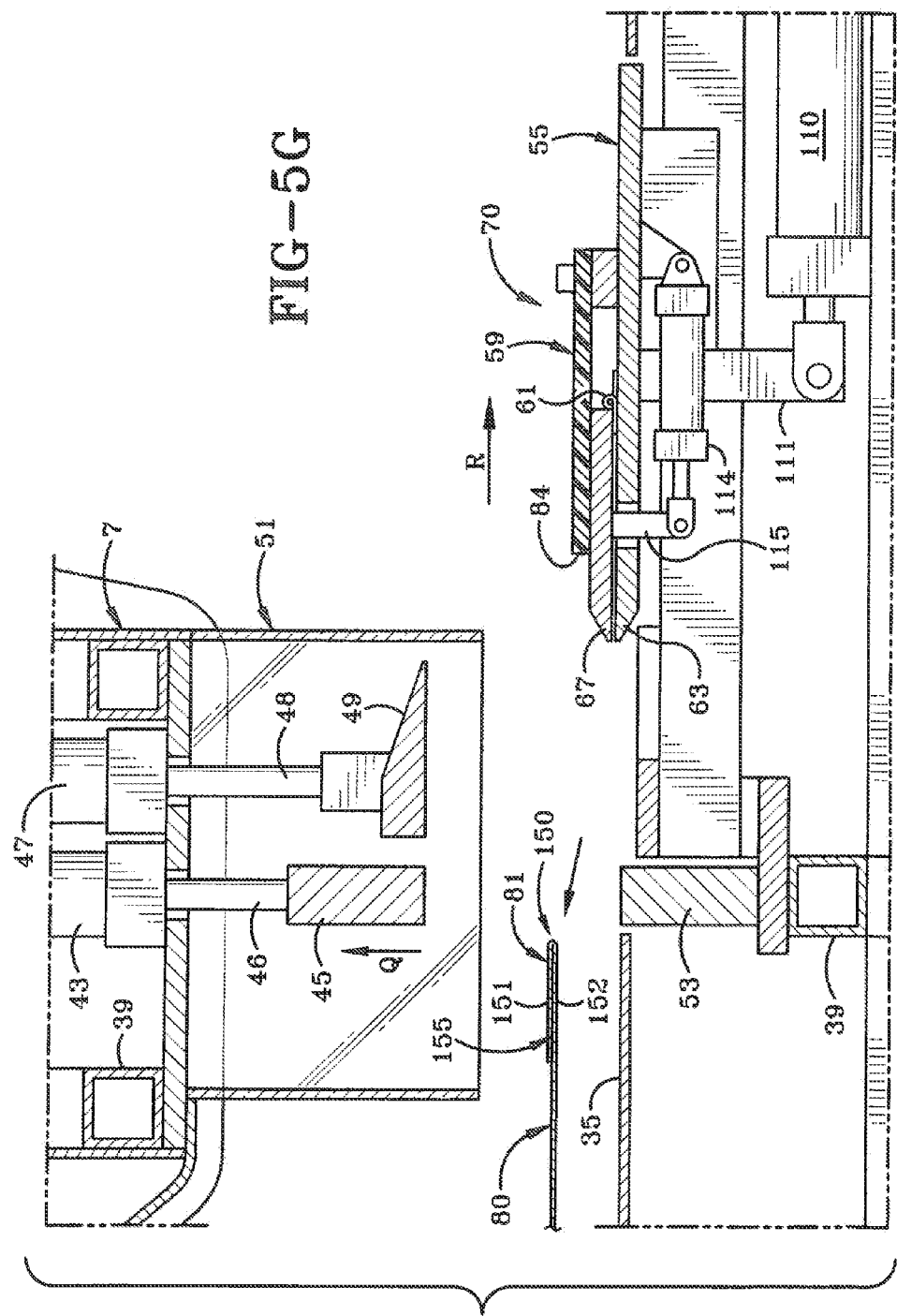

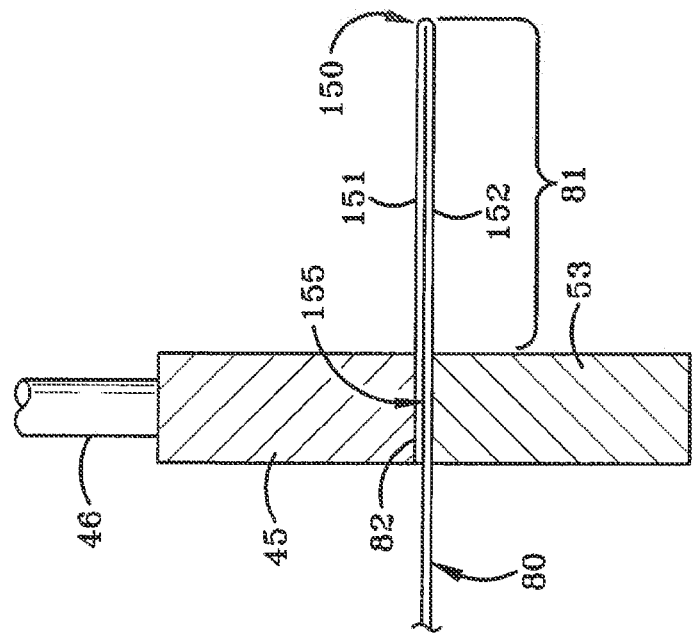
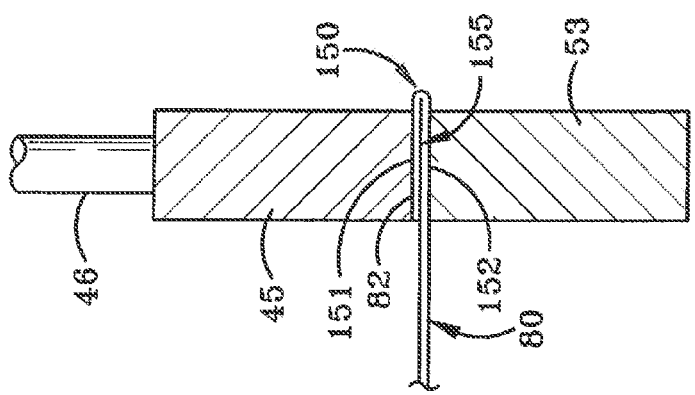
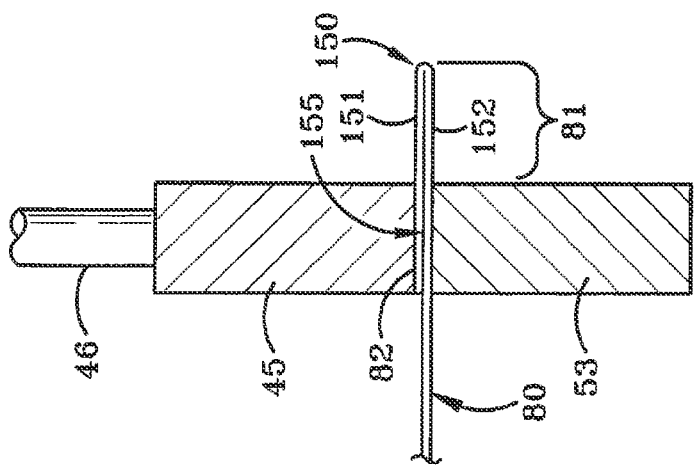

METHOD OF FOLDING AND WELDING FABRIC

CROSS REFERENCE TO RELATED APPLICATION

This application claims priority from U.S. Provisional Patent Application Ser. No. 61/722,432, filed Nov. 5, 2012; the disclosure of which is incorporated herein by reference.

BACKGROUND OF THE INVENTION

1. Field of Invention

The current invention relates generally to apparatus, systems and methods for creating seams on plastic fabric. More particularly, the apparatus, systems and methods relate to creating seam edges on plastic fabric using heat. Specifically, the apparatus, systems and methods provide for automatically creating plastic folded seams on the edges of plastic fabric.

2. Description of Related Art

The creation of seams at the edges of material is well known in the art. In an effort to reinforce fabric around its perimeter, the fabric is typically folded at its edges. The folded fabric is then attached to the underlying fabric to create a perimeter that has twice the fabric thickness as the original sheet of fabric. This provides for a fabric that can be used in awnings and signage that has reinforced edges that can now better withstand weather and wind. Additionally, an elongated pocket can be formed by not completely attaching all of the folded fabric to the underlying sheet of fabric. This allows an elongated structure such as a rod to be slide into the pocket and the rod can be used to hang fabric that is used as signage or to allow the fabric to be mounted to a frame when it is to be used in awning applications. Current methods of manipulating fabric and welding/connecting the folded material to the main sheet of fabric are labor intensive and the fabric is difficult to manipulate. Therefore, a better way of creating a fold at the edges of fabric is desired.

SUMMARY

The preferred embodiment of the invention is a welding machine that can fold and weld edge seams of fabric. The welding machine includes a lower weld bar secured to a housing, an upper weld bar configured to move up and down and a fabric fold base plate that moves horizontally. The fabric fold base plate includes a fabric position stop and a fabric clamp. The fabric position stop provides a stop to allow an operator to easily align an edge of a piece of fabric with the fabric position stop. After that, the operator can merely press a button and the welding machine folds the edge and welds the edge seam as discussed below without requiring further assistance from the operator. After the fabric edge is placed against the fabric position stop and the button is pressed, the fabric pre-fold bar is lowered onto the fabric. Next, the fabric clamp pushes the edge portion of the fabric on top of the fabric pre-fold bar forming a fabric edge where the edge portion is folded with respect to fabric under the edge portion. The fabric clamp and the fabric base plate then act as pinchers and pinch the fabric edge and pull the fabric off of the fabric pre-fold bar. While continuing to pinch the edge portion, the fabric clamp and the fabric base plate acting as pinchers push the edge portion under the upper weld arm with at least some fabric that is under the edge portion of fabric also positioned above the lower welding bar. Next, the welding machine lowers the upper welding bar onto the edge portion of fabric to weld that fabric to fabric between it and the lower welding arm.

Another configuration of the preferred embodiment of the invention is a method of welding a fold at the edge of a piece of fabric. The method begins by lowering a fabric pre-fold bar so that the fabric pre-fold bar is above a piece of fabric. An edge of the fabric would have previously been aligned with a fabric position stop on a welding machine. A portion of the fabric is then pushed so that a portion of fabric is on top of the pre-fold bar so that the pre-fold bar is between the portion of fabric on top of the fabric pre-fold bar and other fabric below the pre-fold bar. The fabric on top of the fabric pre-fold bar is folded edge fabric and fabric not on top of the fabric pre-fold bar is not folded edge fabric. A folded end is formed where the folded edge fabric and not folded edge are folded. Next, some of the fabric at the folded end is pinched and pulled off of the fabric pre-fold bar. At least some of the folded edge fabric is then welded to the not folded edge fabric. For example, all of the folded edge fabric can be welded to the not folded edge fabric to create a continuous solid weld or only part of the folded edge fabric (a part beginning at the edge of the fabric) can be welded to create a pocket or un-welded area between the weld and the folded end.

In one configuration of the preferred embodiment, a button can be pushed and then the lowering the fabric pre-fold bar, the pushing a portion of the fabric, the pinching some of the fabric at the folded end, the pulling the folded edge fabric off of the fabric pre-fold bar and the welding are all preformed automatically after the button is pushed.

Another configuration of the preferred embodiment is a welding machine that folds and welds edge seams of a fabric. The welding machine includes a weld bar, a fabric pre-fold bar that moves up and down and a fabric fold base plate. The fabric clamp pushes a portion of the fabric on top of the fabric pre-fold bar. The fabric that is on top of the fabric pre-fold bar is folded edge fabric and fabric that is under the fabric pre-fold bar is not folded edge fabric. A folded end is formed where the folded edge fabric and the not folded edge are folded. The fabric clamp and the fabric base plate then pinch the folded end and pulls the folded edge fabric off of the fabric pre-fold bar and then pushes the folded end adjacent the weld bar. The weld bar welds together at least some of the folded edge fabric and the not folded edge fabric.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 5A illustrates a cross-sectional side view of the preferred embodiment of the edge seam welding machine as fabric is being aligned with a front edge of a fabric position stop.

FIG. 5B illustrates a cross-sectional side view of the preferred embodiment of the edge seam welding machine as a fabric pre-fold bar is lowered onto the fabric.

FIG. 5C illustrates a cross-sectional side view of the preferred embodiment of the edge seam welding machine as a fabric clamp pushes fabric over the pre-fold bar.

FIG. 5D illustrates a cross-sectional side view of the preferred embodiment of the edge seam welding machine as the fabric clamp begins to clamp the fabric.

FIG. 5E illustrates a cross-sectional side view of the preferred embodiment of the edge seam welding machine as the fabric clamp pulls the fabric off the pre-fold bar.

FIG. 5F illustrates a cross-sectional side view of the preferred embodiment of the edge seam welding machine as the fabric clamp pushes the folded fabric onto a lower welding bar.

FIG. 5G illustrates a cross-sectional side view of the preferred embodiment of the edge seam welding machine as an operator removes the welded fabric from the welding machine.

FIG. 6A illustrates the position of fabric relative to the upper and lower welding bars when the welding machine is used to create a weld with a small pocket.

FIG. 6B illustrates the position of fabric relative to the upper and lower welding bars when the welding machine is used to create a weld with essentially no pocket.

FIG. 6C illustrates the position of fabric relative to the upper and lower welding bars when the welding machine is used to create a weld with a large pocket.

Similar numbers refer to similar parts throughout the drawings.

DETAILED DESCRIPTION

Figure 1:
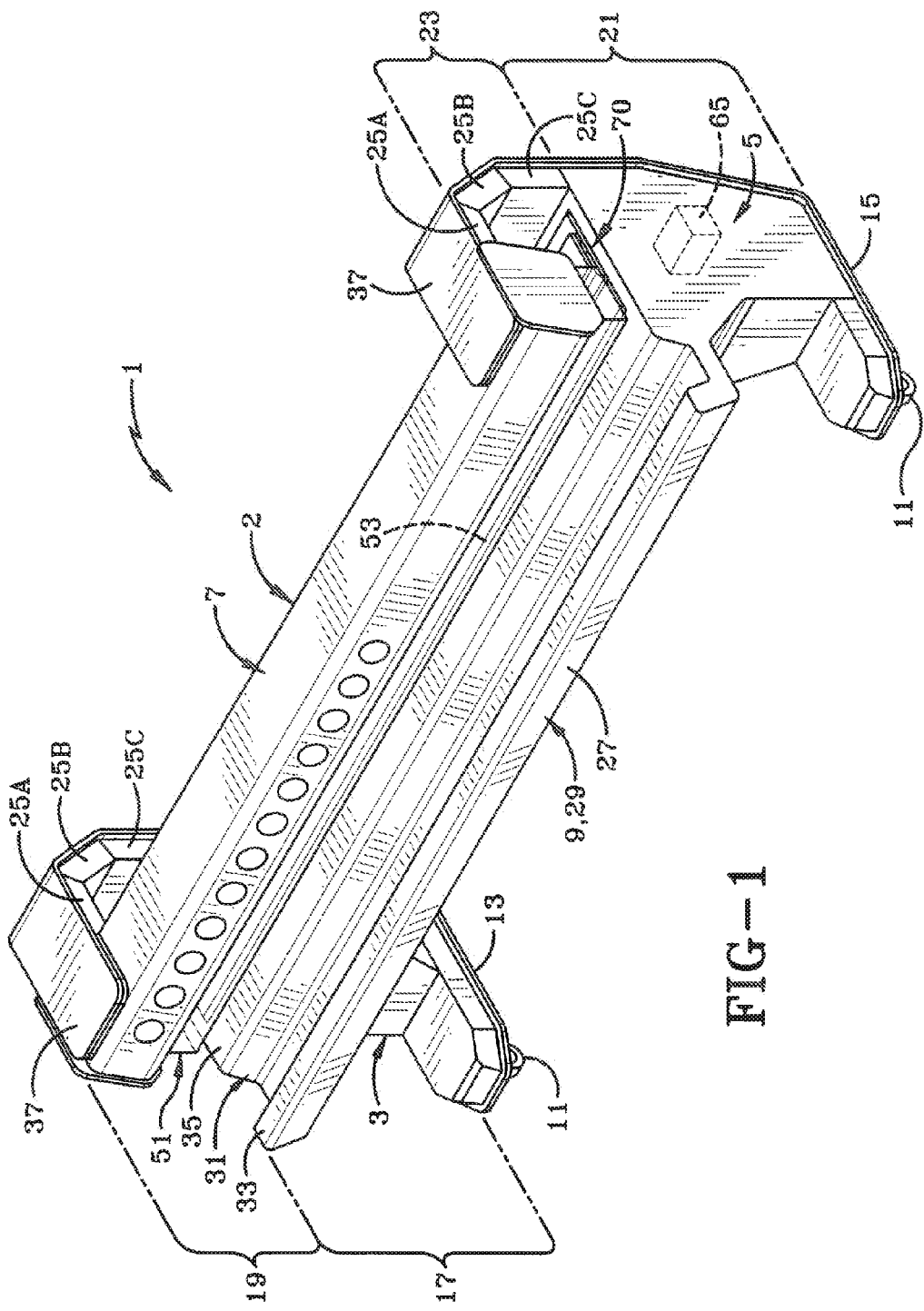
FIG. 1 illustrates a perspective view of a preferred embodiment of an edge seam welding machine.
Figure 2:
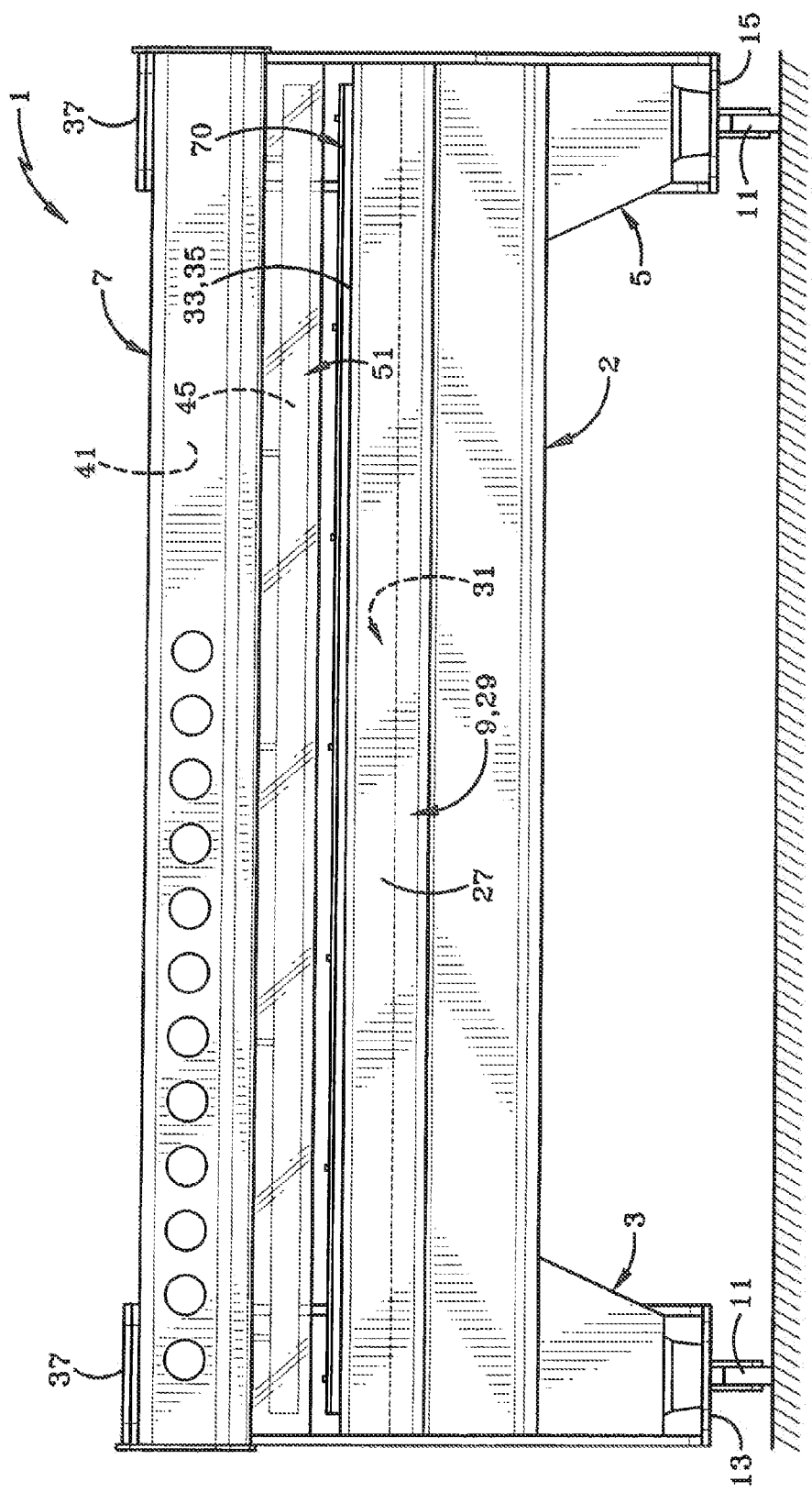
FIG. 2 illustrates a front view of the preferred embodiment of the edge seam welding machine.
Figure 3:
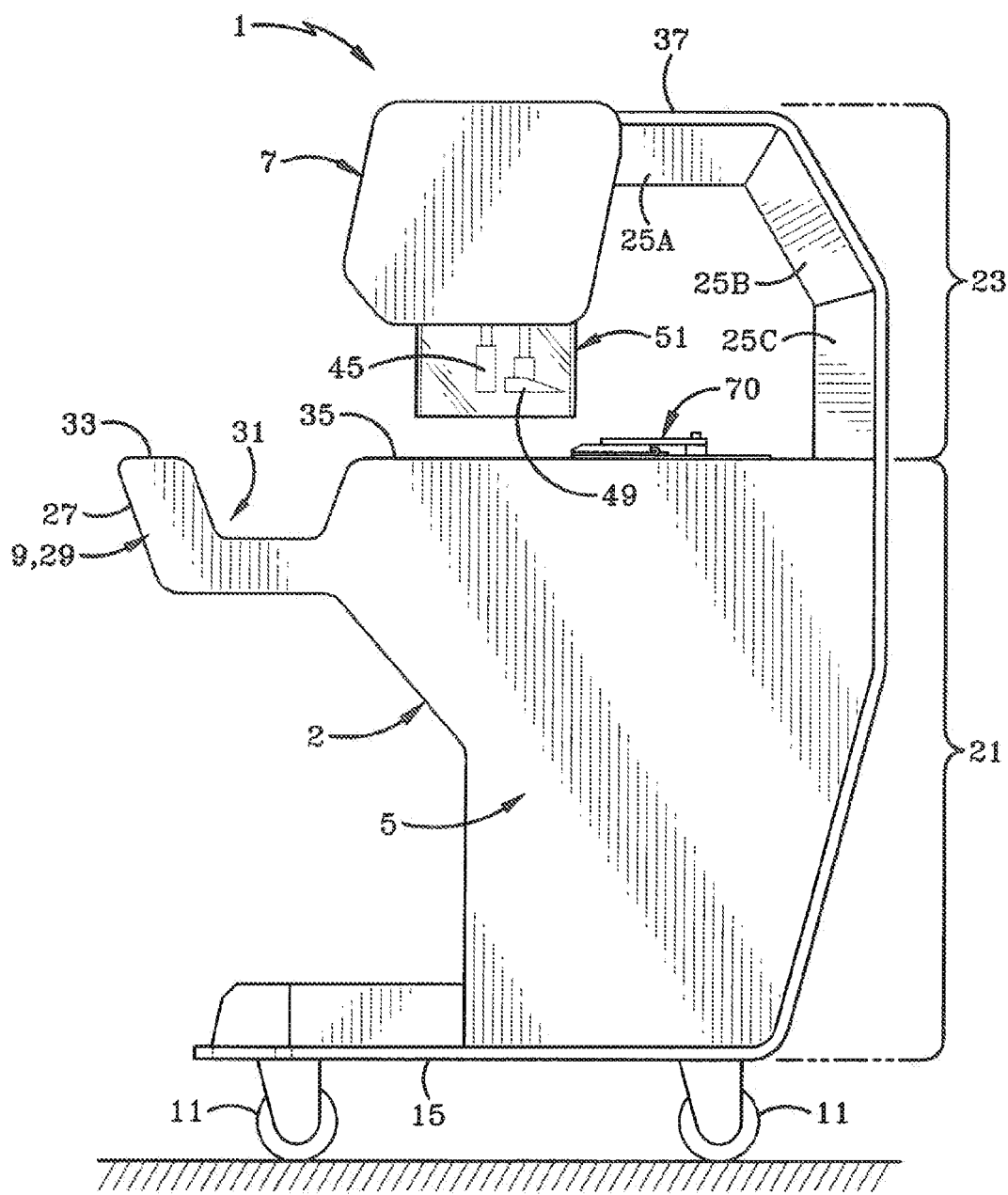
FIG. 3 illustrates a side view of the preferred embodiment of the edge seam welding machine.

FIGS. 1-4 illustrate the preferred embodiment of a welding machine 1 used to create folds at the edge of a sheet of fabric. The welding machine 1 has a housing 2 that includes a housing left support end 3, a housing right support end 5, an upper housing 7 and a central work area housing 9. Wheels 11 can be attached to a lower end 13 of the housing left support end 3 and a lower end 15 of the housing right support end 5 to allow the welding machine 1 to be easily moved from one location to another. Alternatively, pedestals or other supporting devices can be located under the lower end 13 of the housing left support end 3 and the lower end 15 of the housing right support end 5.

The housing left support end 3 includes a left housing base portion 17 and a left housing arm 19 and the housing right support end 5 includes a right housing base portion 21 and a right housing arm 23. The housing left support end 3 and the housing right support end 5 are essentially mirror images of each other so only the housing right support end 5 (FIG. 3) is described here but its description generally applies to the housing left support end 3. The right housing arm 23 is formed out of three generally trapezoidal shaped sections 25A-C arranged in series. The right housing base portion 21 has a front portion 27 that is formed with a generally L-shaped arm 29. The L-shaped arm 29 creates a portion of a trapezoidal shaped cutout that together with the central work area housing 9 forms an elongated channel 31 that extends downward from upper surfaces 33, 35 and spans the elongated length of the central work area housing 9. The channel 31 provides an area into which fabric may easily be manipulated/stored during the process of creating an edge weld as discussed below.

Figure 4:
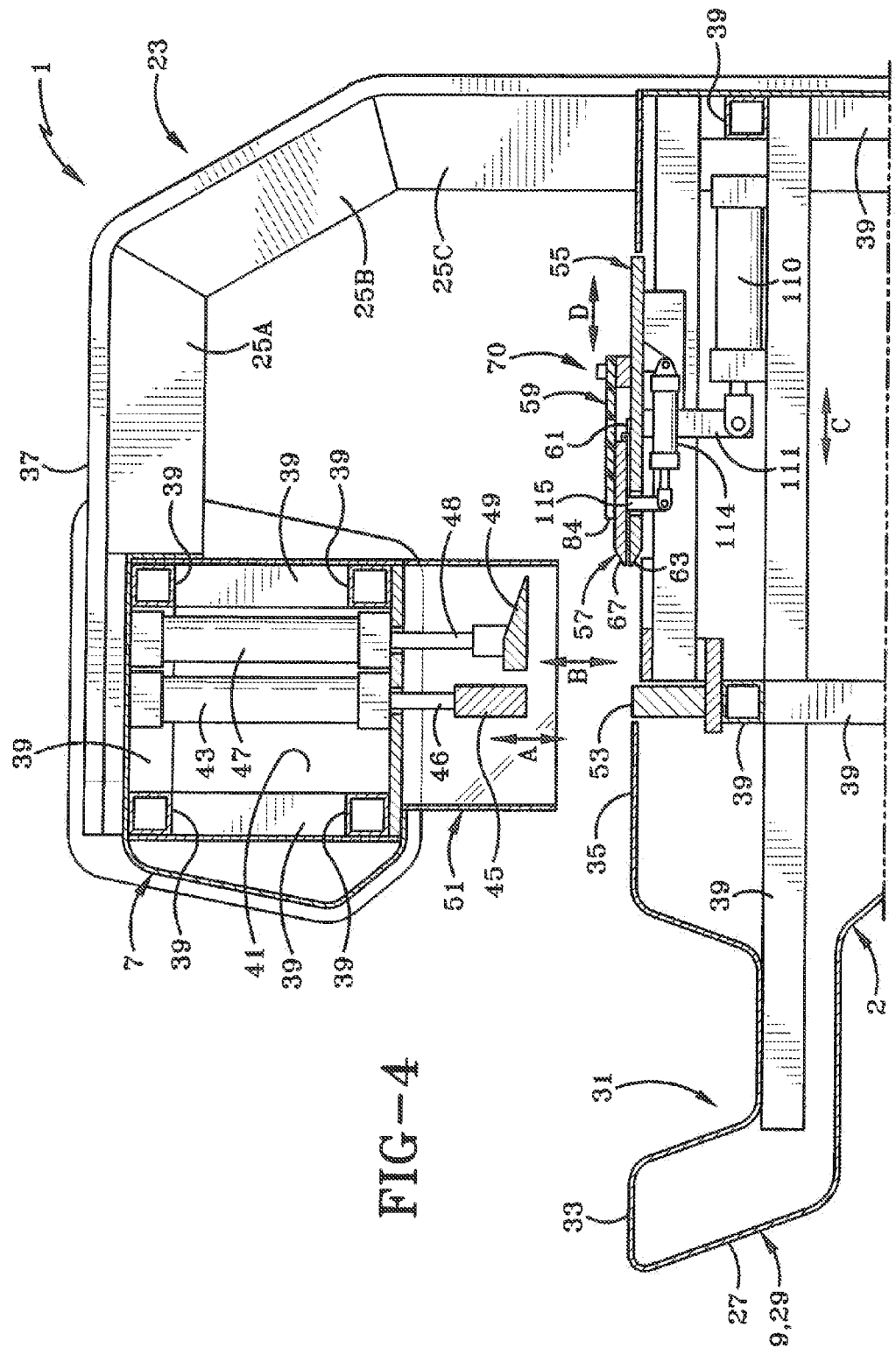
FIG. 4 illustrates a cross-sectional side view of the preferred embodiment of the edge seam welding machine.

A cross-section of the upper housing beam 7 is generally square/rhombus in shape (FIG. 4). The upper housing beam 7 is attached at both ends to upper ends 37 of the left housing arm 19 and the right housing arm 23. The central work area housing 9 includes a front upper surface 33 and a back upper surface 35 that is elongated with both their ends spanning from the left housing base portion 17 to the right housing base portion 21. In general, the housing 2 and its components are given structure and shape by connecting elongated hollow square beams, hollow rectangle beams, angled bars and other rigid structures together as shown in FIG. 4 to form a frame of the welding machine 1. Sheet metal is used to cover the frame to make it functional, safe, attractive and easy to clean. Of course, other materials can be used to form the frame and other materials can be used to cover the frame.

Beams 39 and walls of the upper housing beam 7 form an elongated interior 41 best seen in FIG. 4. A first row of air cylinders 43 are mounted in the interior 41 of the upper housing beam 7 that are connected to an elongated upper welding bar 45 with pistons 46. A second row of air cylinders 47 are mounted in the interior 41 of the upper housing beam 7 that are connected with pistons 48 to an elongated fabric pre-fold bar 49. The first row of air cylinders 43 and the second row of air cylinders 47 are pneumatically controlled to raise and lower the upper welding bar 45 and the fabric pre-fold bar 49, respectively, in the direction of arrows A and B (FIG. 4) independently of each other. The upper welding bar 45 and the fabric pre-fold bar 49 can be retracted into an at least partially transparent cover 51 extending downward from the upper housing beam 7.

A lower welding bar 53 is rigidly mounted adjacent the upper surface 35 of the central work area housing 9 directly under the upper welding bar 45 (FIG. 4). The central work area housing 9 further includes a fabric fold base plate 55 that provides a mount for a fabric clamp 57 and a fabric position stop 59. The fabric fold base plate 55, the fabric clamp 57 and the fabric position stop 59 form what will be referred to as a fabric positioning assembly 70. The fabric clamp 57 can be pivotally connected to the fabric fold base plate 55 with a hinge device 61 or another connection that allows it to pivot. Motors, gears, pneumatic actuators and the like can control the fabric fold base plate 55 to move it back and forth in the directions of arrow C (FIG. 4) and cause the fabric clamp 57 to open and close with respect to a front end 63 (FIG. 5A) of the fabric fold base plate 55. For example, pneumatic cylinder 110 can control lever 111 to cause the fabric positioning assembly 70 to move in the directions of arrow D and pneumatic cylinder 114 can through lever 115 cause the fabric clamp to open and close. A controller logic 65 (FIG. 1) in the housing 2 can control the motors, gears, pneumatic actuators and the like to control the movements of the fabric clamp 57 and the fabric fold base plate 55. The position of the fabric position stop 59 can also be moved with respect to arrow D and moved into a desired position on the fabric fold base plate 55. A front end 67 of the fabric clamp 57 and the front end 63 of fabric fold base plate 55 can be tapered so that they form a pointed edge.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logical logics into one physical logic. Similarly, where a single logical logic is described, it may be possible to distribute that single logic between multiple physical logics.

Having described the structure of the welding machine 1 and its key components, its operation and use will now be described. In general, the improved welding machine 1 provides for a much more automated way of creating folded edge seams and pockets than prior art machines. As mentioned above, the thickness of the edge seam (and its pocket if one is desired) is controlled by adjusting the position of the fabric position stop 59 with respect to the fabric fold base plate 55. For example a wing nut of a bolt passing through the fabric position stop 59 and the fabric fold base plate 55 can be loosened. Next, the fabric position stop 59 is slid as indicated by arrows D in FIG. 4 to a desired position with respect to the fabric fold base plate 55 so that a desired edge seam thickness is created. For example, in the preferred embodiment the upper welding bar 45 and the lower welding bar 53 have a 25 mm thickness to allow up a 25 mm edge seam to be created and the fabric position stop 59 can be positioned far enough to the left to create a 25 mm weld with a 2.5 inch pocket. FIG. 6A illustrates the positioning of a piece of fabric 80 with respect to the upper welding bar 45 and the lower welding bar 53 after the fabric position assembly 70 has manipulated them (as discussed below) in preparation for a 25 mm weld with about a 25 mm pocket. FIG. 6B illustrates the positioning of a piece of fabric 80 with respect to the upper welding bar 45 and the lower welding bar 53 after the fabric position assembly 70 has manipulated them (as discussed below) in preparation for about a 25 mm weld without any pocket. FIG. 6C illustrates the positioning of a piece of fabric 80 with respect to the upper welding bar 45 and the lower welding bar 53 after the fabric position assembly 70 has manipulated them (as discussed below) in preparation for a 25 mm weld with a large 2.5 inch pocket 81 that is not welded.

After the fabric position stop 59 is adjusted with respect to the fabric fold base plate 55 for a desired edge seam thickness, the process of creating an edge seam begins with the upper welding bar 45 and the fabric pre-fold bar 49 in raised positions (see FIG. 5A), preferably four inches or more above the lower welding bar 53 and the upper surface 35 of the central work area housing 9. This allows an operator to slide a piece of fabric 80 in the direction of arrow E along the upper surface 35 of the central work area housing 9 over the lower welding bar 53 so that a perimeter edge 82 of the fabric 80 is pushed up to and is adjacent a front edge 84 of the fabric position stop 59. In the preferred embodiment, upon placing the fabric 80 in this position the operator of the welding machine 1 merely presses a button to begin a series of actions by the welding machine 1 and its fabric positioning assembly 70.

First, as shown in FIG. 5B the fabric pre-fold bar 49 is lowered in the direction of arrow F by its air-cylinders 47. Next, pneumatic cylinder 114 moves its piston in the direction of arrow G (FIG. 5C) to cause the fabric clamp 57 to open a bit in the direction of arrow H. Next, the fabric position assembly 70 is moved to the left in the direction of arrow I so that the portion of fabric resting on top of the fabric clamp 57 is pushed in the direction of arrow J over top of the fabric pre-fold bar 49. Next, the fabric positioning assembly 70 is moved to the left as shown in FIG. 5C so that the front end 67 of the fabric clamp 57 is above a right side portion 74 of the fabric pre-fold bar 49 and the front end 63 of the fabric fold base plate 55 is under right side portion 74 of the fabric pre-fold bar 49. Next, as shown in FIG. 5D the pneumatic cylinder 114 causes through lever 115 the fabric clamp 57 to lower in the direction of arrow L so that a folded end 150 of the fabric 80 is pinched between the fabric clamp 57 and the fabric fold base plate 55. Note that the fabric on top of the fabric pre-fold bar is folded edge fabric 151 and fabric not on top of the fabric pre-fold bar is not folded edge fabric 152. After that, the fabric positioning assembly 70 is moved to the right in the direction of arrow M (FIG. 5E) and the fabric pre-fold bar 49 is moved upward in the direction of arrow N. Finally, as shown in FIG. 5F, the fabric positioning assembly 70 is move in the direction of arrow O to the left to position the folded portion of the fabric 80 between the two welding bars 45, 53 and then the upper welding bar 45 is lowered in the direction of arrow P so that the folded portion of the fabric is pressed together and held for a long enough time so that the a weld 155 is formed between the two fold pieces of fabric.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:
1. A method of welding a fold at an edge of a piece of fabric with a welding machine, the method comprising:
   lowering a fabric pre-fold bar so that the fabric pre-fold bar is above the piece of fabric;
   pushing a portion of the fabric so that the portion of fabric is on top of the pre-fold bar so that the pre-fold bar is between the portion of fabric on top of the fabric pre-fold bar and other fabric below the pre-fold bar, wherein the portion of the fabric on top of the fabric pre-fold bar is folded edge fabric and fabric not on top of the fabric pre-fold bar is not folded edge fabric, and wherein a folded end is formed where the folded edge fabric and the not folded edge fabric are folded;
   moving the folded edge fabric off of the fabric pre-fold bar; and
   welding at least some of the folded edge fabric to the not folded edge fabric.

2. The method of welding a fold at the edge of a piece of fabric of claim 1 further comprising:
   Pinching some of the fabric at the folded end.

3. The method of welding a fold at the edge of a piece of fabric of claim 2 wherein the pushing the portion of the fabric further comprises:

pushing the portion of the fabric with an open fabric clamp so that the portion of fabric is pushed on top of the pre-fold bar.

4. The method of welding a fold at the edge of a piece of fabric of claim 3 further comprising:

moving the pre-fold bar upward away from the folded edge fabric.

5. The method of welding a fold at the edge of a piece of fabric of claim 3 wherein the pinching some of the fabric at the folded end further comprises:

pinching some of the fabric at the folded end between the fabric clamp and a fabric fold base plate.

6. The method of welding a fold at the edge of a piece of fabric of claim 1 wherein the welding further comprises:

lowering an upper weld bar down onto the folded edge fabric to press the folded edge fabric and the not folded edge fabric together between a lower weld bar under the not folded edge fabric and the upper weld bar.

7. The method of welding a fold at the edge of a piece of fabric of claim 1 wherein the welding creates a pocket that is not welded between a welded portion and the folded end.

8. The method of welding a fold at the edge of a piece of fabric of claim 2 further comprising:

pushing a button, where the lowering the fabric pre-fold bar, the pushing the portion of the fabric, the pinching some of the fabric at the folded end, the moving the folded edge fabric off of the fabric pre-fold bar and the welding are all performed automatically after the pushing the button without a user needing to further interact with the welding machine.

* * * * *